(12) United States Patent
Wirth et al.

(10) Patent No.: US 11,952,018 B2
(45) Date of Patent: Apr. 9, 2024

(54) DRIVE SYSTEM FOR A VEHICLE, METHOD FOR OPERATING THE DRIVE SYSTEM, AND VEHICLE COMPRISING DRIVE SYSTEM

(71) Applicant: Bombardier Transportation GmbH, Berlin (DE)

(72) Inventors: Christian Wirth, Winterthur (CH); Markus Vogelsberger, Trins (AT)

(73) Assignee: Bombardier Transportation GmbH, Berlin (DE)

( * ) Notice: Subject to any disclaimer, the term of this patent is extended or adjusted under 35 U.S.C. 154(b) by 543 days.

(21) Appl. No.: 17/124,603

(22) Filed: Dec. 17, 2020

(65) Prior Publication Data

US 2021/0188328 A1 Jun. 24, 2021

(30) Foreign Application Priority Data

Dec. 19, 2019 (DE) .................... 10 2019 220 169.5
Dec. 15, 2020 (EP) .................... 20214182

(51) Int. Cl.
*B61C 3/00* (2006.01)
*H02P 6/04* (2016.01)
*H02P 6/16* (2016.01)

(52) U.S. Cl.
CPC .............. *B61C 3/00* (2013.01); *H02P 6/04* (2013.01); *H02P 6/16* (2013.01)

(58) Field of Classification Search
CPC .. B61C 3/00; B61C 3/02; B61C 11/00; B61C 15/00; H02P 6/04; H02P 6/16
See application file for complete search history.

(56) References Cited

U.S. PATENT DOCUMENTS

| 6,163,127 A * | 12/2000 | Patel ................. B60L 15/025 318/705 |
| 7,937,194 B2 | 5/2011 | Nasr et al. |
| 8,008,878 B2 | 8/2011 | Götz et al. |
| 10,486,534 B2 | 11/2019 | Cai et al. |
| 11,479,127 B2 | 10/2022 | Wein et al. |
| 2006/0272863 A1 | 12/2006 | Donahue |
| 2010/0187024 A1 | 7/2010 | Tang |

(Continued)

FOREIGN PATENT DOCUMENTS

| CN | 101061020 A | 10/2007 |
| CN | 102267449 A | 12/2011 |

(Continued)

*Primary Examiner* — Robert J McCarry, Jr.
(74) *Attorney, Agent, or Firm* — The Webb Law Firm

(57) ABSTRACT

A drive system for a vehicle includes a plurality of electric traction motors, each mechanically coupled to at least one drive wheel to generate traction. At least one traction power converter is connected on an AC voltage side to at least one electric traction motor to supply the electric traction motor with electric power. A traction control unit for controlling at least one traction power converter is provided and is designed to control the at least one traction power converter while the vehicle is moving based on electrical output alternating quantities of the at least one traction power converter. A rotational movement of the at least one drive wheel of the vehicle during standstill of the vehicle is not detected by a separate detection unit based on the output alternating quantities.

11 Claims, 2 Drawing Sheets

(56) References Cited

U.S. PATENT DOCUMENTS

| | | | |
|---|---|---|---|
| 2012/0116617 A1 | 5/2012 | Schaffler et al. | |
| 2014/0217973 A1 | 8/2014 | Lee et al. | |
| 2016/0153157 A1 | 6/2016 | Byrne | |
| 2017/0334414 A1 | 11/2017 | Kumar et al. | |
| 2018/0126852 A1 | 5/2018 | Moriya et al. | |

FOREIGN PATENT DOCUMENTS

| | | |
|---|---|---|
| CN | 107438533 A | 12/2017 |
| DE | 102008004300 A1 | 7/2009 |
| DE | 102013200979 B3 | 4/2014 |
| DE | 102015225956 A1 | 6/2017 |
| DE | 102016223186 A1 | 5/2018 |
| EP | 2023479 B1 | 4/2014 |
| JP | H09327102 A | 12/1997 |
| JP | 2005176490 A | 6/2005 |
| RU | 2707429 C1 | 11/2019 |
| WO | 2012004343 A1 | 1/2012 |

\* cited by examiner

DRIVE SYSTEM FOR A VEHICLE, METHOD FOR OPERATING THE DRIVE SYSTEM, AND VEHICLE COMPRISING DRIVE SYSTEM

CROSS-REFERENCE TO RELATED APPLICATIONS

This application claims priority to German Patent Application No. 10 2019 220 169.5 filed Dec. 19, 2019 and European Patent Application No. 20214182.6 filed Dec. 15, 2020, the disclosures of which are hereby incorporated by reference in their entirety.

BACKGROUND OF THE INVENTION

Field of the Invention

The invention relates to a drive system for a vehicle, in particular a rail vehicle.

The invention moreover relates to a method for operating the drive system of a vehicle.

The invention furthermore relates to a vehicle, in particular a rail vehicle, comprising the drive system according to the present invention.

Description of Related Art

Rotary encoderless drive systems for vehicles are known from the literature.

Rotary encoderless in connection with the present specification shall be understood to mean the absence of a device that renders the rotor position/rotational angle of a traction motor or the rotational angle of a wheel, while the vehicle is moving, directly measurable or at least derivable.

Other known terms for rotary encoder are speed sensor, speed transmitter, impulse transmitter, signal generator or also tacho sensor.

The patent application JP2005176490, for example, describes a sensorless drive system for vehicles.

Detecting the rotor position of the traction motors of the drives, however, remains necessary for traction control, in particular in vector-based control processes.

Methods have therefore been developed, as described in the patent application WO2012/004343, for example, which make it possible to derive the rotor position based on the measurement and evaluation of the phase currents and phase voltages of the traction motor.

Doing so, however, requires continuously supplying alternating quantities to the traction motors so as to render the rotor position derivable. The term 'alternating quantity' in connection with the present specification shall be understood to mean alternating voltage and/or alternating current, as is customary in electrical engineering. This also encompasses pulse-shaped alternating quantities in current and/or voltage, as well as the harmonics thereof. In the case of vehicles, it is often required to monitor the standstill of the vehicle so as to take appropriate counter-measures in the event the vehicle rolls away, thereby preventing the vehicle from rolling away.

If drive systems of vehicles are designed to be encoderless, rotary encoders are consequently absent.

The inventors recognized that, if the drive system of the vehicle is designed to be encoderless, it is necessary to supply the traction motors also with alternating quantities while the vehicle is at a standstill so as to be able to infer a movement of the vehicle based on a change in the rotor position of a traction motor.

Standstill within the course of the present specification shall be understood to mean the vehicle standstill, the mechanical standstill of an output shaft of a traction motor, or also the mechanical standstill of a wheel.

Supplying the traction motors with alternating quantities has in particular a disadvantageous effect in the case of rail vehicles since these vehicles are often designed with a plurality of traction motors, so that high energy expenditure is required for monitoring the standstill.

SUMMARY OF THE INVENTION

It is therefore the object of the invention to create a drive system for a vehicle, a method for operating the drive system, and a vehicle comprising a drive system, in which the standstill identification of the vehicle is made possible, even though the vehicle comprises a rotary encoderless drive system.

It is also an object of the invention to reduce the power consumption of the vehicle during the standstill, in particular for monitoring the vehicle standstill.

Rather, the power consumption is reduced, without adversely affecting the reliability of the standstill identification in the process.

It shall be noted, for clarification, at this point that a detection of a rotational movement of at least one wheel of the vehicle during the standstill shall be understood to mean that the expected state or the target state is the standstill. The detection serves in particular the purpose of identifying a deviation from this state, namely, for example, a rotational movement of at least one drive wheel, even though this is not desirable or not expected. The term "standstill state" or "state of standstill" used hereafter is in particular the state in which the standstill is expected and/or desirable.

A drive system for a vehicle is provided, which can advantageously be used in vehicles comprising a plurality of traction motors. Such a vehicle can be a rail vehicle. However, other types of vehicles, such as automobiles, can also be designed with a plurality of traction motors. The drive system for such a vehicle comprises a plurality of electric traction motors, wherein each of the individual electric traction motors is mechanically coupled to at least one drive wheel to generate traction.

In the present connection, a plurality of traction motors shall be understood to mean at least two traction motors.

The vehicle, however, preferably comprises more than two traction motors, that is, at least three traction motors.

The traction motors are preferably designed as single-phase or polyphase asynchronous motors, wherein other types, such as single-phase or polyphase permanently excited synchronous motors, or also single-phase or polyphase reluctance motors, can also be used as traction motors.

Each of the individual traction motors is mechanically connected by way of a corresponding drive shaft to at least one drive wheel, wherein a speed-transforming gear can also be arranged between the traction motors and the drive wheel.

The torque generated by the traction motors during operation is translated into traction via the drive shaft and the drive wheel, so as to accelerate the vehicle, decelerate it, or, if necessary, prevent the vehicle from rolling away on a grade.

The drive system furthermore comprises at least one traction power converter.

The traction power converter comprises at least one power input and at least one power output, wherein the traction power converter can be connected on the input side to a DC voltage intermediate circuit and on the output side, that is, the AC voltage side, provides a preferably polyphase alternating voltage, wherein the frequency, amplitude and phase of this alternating voltage are variable.

As an alternative, the power converter can also be connectable to an AC voltage source on the input side, as is customary with matrix converters.

The concept of "AC voltage side" would also refer to the output of the matrix converter in this case.

The traction power converter is connected on the AC voltage side to at least one electric traction motor, in order to supply the at least one electric traction motor with electric power. The drive system furthermore comprises an open-loop and closed-loop traction control unit, traction control unit for short, which can be configured in the form of a microprocessor control unit or processor unit and is used for the closed-loop and/or open-loop control of at least one traction power converter.

The traction control unit is in particular designed so as to be able to control both by closed-loop and by open-loop control.

If a plurality of traction power converters are present, a respective traction control unit can be assigned to each traction power converter. As an alternative, a traction control unit that controls a plurality of traction power converters by closed-loop and/or open-loop control can also be present.

The traction control unit is designed to control, by closed-loop and/or open-loop control, the at least one traction power converter while the vehicle is moving based on electric output alternating quantities of the at least one traction power converter.

For this purpose, the traction control unit comprises at least one first signal input so as to measure the electric output alternating quantities of the at least one traction power converter. In addition or as an alternative, the traction control unit can also detect at least one further or other quantity, in particular an electrical quantity, of the at least one traction power converter via the at least one first signal input, so as to infer a rotational movement of at least one drive wheel.

This can, for example, be a voltage and/or current at the power input of the traction power converter.

The quantity can, in particular, be a quantity that is influenced by an electrical state and/or a magnetic state of the electric traction motor or at least one of the electric traction motors, wherein the state is dependent on a movement and/or position of a rotor of the electric traction motor. Examples of such quantities are described in EP 2 023 479 B1, paragraph [0001], for example the rotor back-EMF influencing the stator current or that resulting from the current-carrying stator winding being coupled to a test signal source.

This first signal input is preferably an interface, which allows analog signals of current measuring sensors and/or voltage measuring sensors to be further processed, in terms of signaling.

The analog signals have to be accordingly digitized prior to further processing.

This signal input can, as an alternative or in addition, also be designed to further process already digitized signals of current measuring sensors and/or voltage measuring sensors, in terms of signaling.

The traction control unit also comprises a signal input (for example, a second signal input) to read in the output signals of a detection unit for detecting a rotational movement of a wheel.

A rotational movement of a wheel results in a change of the rotation angle of the wheel. The detection unit is able to detect this change of the rotation angle of the wheel.

The detection unit can provide an analog signal, which has to be digitized by the traction control unit prior to further processing.

As an alternative, however, the signal can already be provided by the detection unit in digitized form.

This analog or digitized signal may be a simple binary signal, which signals that the wheel is carrying out a rotational movement, but does not provide any further information that can be evaluated.

The signal provided by the detection unit is not evaluated by the traction control unit during the movement, that is, during a driving operation of the vehicle.

Even though the drive system comprises such a detection unit, it shall, due to this circumstance, furthermore be considered to have an encoderless design when signals of the detection unit are not used to control, by closed-loop and/or open-loop control, traction power converters while the vehicle is driving, and are not used to detect a rotational movement of a wheel while the vehicle is driving.

In particular, the traction control unit is designed to not use signals of the detection unit for controlling, by closed-loop and/or open-loop control, at least one traction power converter, and/or to not use signals for detecting a rotational movement of at least one wheel of the vehicle, while the vehicle is driving.

As will become apparent during the further course of the present specification, the signal of the detection unit is exclusively evaluated during the standstill of the vehicle. "During the standstill" shall in particular be understood to mean that the standstill actually exists or should exist. For example, a mechanical brake of the rail vehicle and/or a dynamic brake of the rail vehicle is active during the standstill. Despite the active brake(s), a wheel movement may occur, for example since the brake shoe(s) of a mechanical brake acting on at least one wheel of the rail vehicle does or do not generate a sufficient braking force.

Moreover, the traction control unit comprises at least one first signal output to activate the at least one traction power converter.

The conversion of the traction power converter can be influenced by the activation of the traction power converter. In particular, the frequency, amplitude and/or phase of the output-side alternating voltage can be influenced by the activation of the traction power converter.

The traction control unit furthermore comprises at least one further signal input, which is used to receive control signals from a higher-level vehicle control unit.

These control signals can, for example, include information related to the speed and/or the acceleration of the vehicle.

Based on this information of the higher-level vehicle control unit, the traction control unit influences the at least one traction power converter, and in particular the electrical output alternating quantities.

The traction control unit is designed so as to control the movement of the vehicle based on electrical output alternating quantities of the at least one traction power converter.

For this purpose, the traction control unit includes a program sequence that detects the output-side alternating quantities of the traction power converter, calculates a frequency, an amplitude and/or a phase of the output-side alternating voltage of the traction power converter based on the specification of the higher-level vehicle control unit, and then sets these in the traction power converter.

The traction control unit furthermore detects the position of the rotor, using the rotary encoderless methods described at the outset, and controls the output-side alternating voltage of the traction power converter with respect to frequency, amplitude and/or phase corresponding to the rotor position of the plurality of electric traction motors.

In particular for the evaluation using the aforementioned methods, the traction control unit detects a rotational movement of a drive wheel or of a non-driven wheel of the vehicle, based on the evaluation of at least one detection unit suitable for this purpose, wherein the at least one detection unit does not detect any electrical output alternating quantities of the at least one traction power converter and also does not detect any quantity that is dependent on the electrical and/or magnetic state of the traction motor(s).

In the process, the traction control unit controls the at least one traction power converter in this operating point in such a way that no electrical output alternating quantities are generated. For this purpose, the traction control unit evaluates the signal, in particular at the second signal input, to read in the output signals of a detection unit for detecting a rotational movement of a wheel.

The detection unit is preferably connected to a wheel, which may be a drive wheel or a non-driven wheel, to convert a rotational movement of the wheel into evaluatable signals.

This means in particular that, when a wheel carries out a rotational movement, the detection unit is able to detect this rotational movement based on the evaluatable signals.

This conversion of a rotational movement into evaluatable signals takes place independently of the operation of the at least one traction power converter, and in particular independently of the electrical output alternating quantities of the at least one traction power converter.

Rather, the detection unit requires particularly little energy for detecting a rotational movement and providing a signal. The power consumption during operation of the detection unit is preferably less than 100 watt, however particularly preferably less than 10 watt.

As described above, the detection unit can provide an analog or an already digitized signal. The evaluation of the detection unit, as an alternative to the evaluation of the electrical output alternating quantities or of the quantity that is dependent on the electrical and/or magnetic state of the traction motor(s), has the advantage that the vehicle, during the standstill, consumes particularly little energy, since the at least one traction power converter does not provide any electrical output alternating quantities for the detection of a rotational movement, and it is also not necessary, for example, to operate a test signal source.

In addition to the evaluation of the output-side alternating quantities and/or of the quantity that is dependent on the electrical and/or magnetic state of the traction motor(s), the traction control unit, while the vehicle is driving, detects a rotational movement of a drive wheel or of a non-driven wheel of the vehicle, based on the evaluation of at least one detection unit suitable for this purpose, wherein the at least one detection unit does not detect any electrical output alternating quantities of the at least one traction power converter, and also does not detect any quantity that is dependent on the electrical and/or magnetic state of the traction motor(s). For this purpose, the traction control unit evaluates in particular the signal at a second signal input, so as to read in the output signals of a detection unit for detecting a rotational movement of a wheel.

In particular, however, signals of the detection unit are not used for the closed-loop and/or open-loop control of at least one traction power converter, and/or are not used for a detection of a rotational movement of at least one wheel of the vehicle, while the vehicle is driving.

The detection unit is preferably connected to a wheel, which may be a drive wheel or a non-driven wheel, to convert a rotational movement of the wheel into evaluatable signals. This means in particular that, when a wheel carries out a rotational movement, the detection unit is able to detect this rotational movement based on the evaluatable signals.

Rather, the detection unit requires particularly little energy for detecting a rotational movement and providing a signal. The power consumption during operation of the detection unit is preferably less than 100 watt, however particularly preferably less than 10 watt. The conversion of a rotational movement into evaluatable signals takes place independently of the operation of the at least one traction power converter, and in particular independently of the electrical output alternating quantities of the at least one traction power converter and of a quantity that is dependent on the electrical and/or magnetic state of the traction motor(s).

As described above, the detection unit can provide an analog or an already digitized signal. The evaluation of the detection unit, in addition to the evaluation of the electrical output alternating quantities for detecting a rotational movement, moreover has the advantage that the detection unit is able to detect a possible movement of the vehicle particularly reliably in the standstill state of the vehicle, since an additional redundant measurement signal is available.

In an advantageous embodiment of the invention, the drive system, and in particular the traction control unit, is furthermore designed to control, by closed-loop or open-loop control, the at least one traction power converter, during the standstill state of the vehicle, in such a way that at least one, but no more than two of the plurality of electric traction motors is or are supplied with electric power.

This is particularly advantageous when the vehicle comprises at least three electric traction motors.

The reason is that, in this case, a reduced number of electric traction motors is supplied with electric power during the standstill of the vehicle, so as to detect the position of the rotor based on the evaluation of the electrical output alternating quantities of the traction power converter, and infer a rotational movement, by way of the evaluation of the electrical output alternating quantities or the quantity that is dependent on the electrical and/or magnetic state of the traction motor(s), using the rotary encoderless methods mentioned at the outset.

As a result, the power consumption of the vehicle during the standstill, in particular for monitoring the vehicle standstill, is reduced.

The prerequisite for such an embodiment of the invention is that the at least one traction power converter generates output alternating quantities or that a quantity is detected that is dependent on the electrical and/or magnetic state of the traction motor(s), wherein the output alternating quantities and/or the aforementioned quantity is/are evaluated by the traction control unit, and the traction control unit does not exclusively evaluate signals of the detection unit for detecting a rotational movement.

As an alternative or in addition to the use of the detection unit for detecting a rotational movement of a wheel in the state of the standstill, the traction control unit can be designed to detect a rotational movement of at least one drive wheel of the vehicle while the vehicle is at a standstill, wherein the traction control unit, in the process, detects a rotational movement based on a change in the electrical output alternating quantities of the at least one traction power converter.

For this purpose, the traction control unit receives from the higher-level vehicle control unit the information that the vehicle is, or should be, at a standstill.

The traction control unit then controls the frequency, amplitude and/or phase of the output-side alternating voltage of the at least one traction power converter in such a way that the traction motors present in the vehicle do not generate any torque.

The traction control unit moreover detects the electrical output alternating quantities of the traction power converter via the first signal input, and additionally, using the rotary encoderless methods mentioned at the outset, calculates the position of the rotor based on the evaluation of the electrical output alternating quantities of the traction power converter.

Since at least one drive wheel is mechanically coupled to the traction motor, the position of the rotor of the traction motor changes when the wheel undergoes a rotational movement.

The traction control unit detects this by constantly, that is continuously, determining the position of the rotor during the standstill of the vehicle, using the aforementioned methods. The accompanying claims, however, do not relate to the detection of the rotational movement during a standstill solely based on a change in the electrical output alternating quantities.

In a further advantageous embodiment of the invention, the drive system, and in particular the traction control unit, is furthermore designed to control the at least one traction power converter, during the standstill of the vehicle, in such a way that no more than one of the plurality of electric traction motors is supplied with electric power.

This is particularly advantageous when the vehicle comprises a plurality of electric traction motors.

The reason is that, compared to the preceding embodiments of the invention, a further reduced number of traction motors is supplied with electric power during the standstill of the vehicle, so as to detect the position of the rotor and/or the speed of the rotor based on the evaluation of the electrical output alternating quantities of the traction power converter, and infer a rotational movement, by way of the evaluation of the electrical output alternating quantities, using the rotary encoderless methods mentioned at the outset.

As a result, the power consumption of the vehicle during the standstill, in particular for monitoring the standstill, is further reduced.

The prerequisite for such an embodiment of the invention is that the at least one traction power converter generates output alternating quantities that are evaluated by the traction control unit, and that the traction control unit does not exclusively evaluate signals of the detection unit for detecting a rotational movement.

In a further advantageous embodiment of the invention, the drive system is designed with a detection unit, wherein the detection unit is a rotary encoder, an acceleration sensor, a resolver or a gravitational force sensor.

The detection unit of the aforementioned kind is attached to a wheel, wherein the wheel can be a drive wheel or a non-driven wheel.

As an alternative, the detection unit can also be attached to the drive shaft of the traction motors.

In any case, the detection unit has to be attached to the vehicle in such a way that a rotational movement of a wheel is converted into a signal, which can be evaluated by the traction control unit.

The use of a detection unit of the aforementioned kind yields several advantages.

The detection units of the aforementioned kind have a very low power consumption, which is considerably less than 10 watt.

This further reduces the power consumption of the vehicle during the standstill.

Additionally, the detection units of the aforementioned kind also do not have a very complex design so that the detection of a rotational movement functions in a very robust and reliable manner, which is essential for safety, especially in this application.

Furthermore, a method for operating the electric drive system described above is provided, which is described hereafter.

It shall be noted that the method can be applied both to the above-described drive system, and to a vehicle, in particular a rail vehicle, that is designed with the above-described drive system.

The method, in a first operating mode, comprises supplying the electric traction motor, or the plurality of electric traction motors, with electric power to generate traction, wherein the rotational speed, the velocity, the torque and/or the position of the rotor of the electric traction motor, or of at least one of the electric traction motors, are controlled, while the vehicle is moving, based on electrical output alternating quantities of the at least one traction power converter. As an alternative or in addition, the rotational speed, the velocity, the torque and/or the position of the rotor of the electric traction motor, or of at least one of the electric traction motors, are controlled, while the vehicle is moving, based on at least one quantity that is influenced by an electrical and/or magnetic state of the electric traction motor, or of at least one of the electric traction motors, wherein the state is dependent on a movement and/or a position of a rotor of the electric traction motor(s).

The electric power is provided by the at least one traction power converter, wherein the control of the at least one traction power converter as well as of the electric traction motors is carried out by the traction control unit.

In a second operating mode, the method furthermore comprises: detecting a rotational movement of at least one wheel of the vehicle (in particular of a drive wheel or a non-driven wheel), by evaluating at least one detection unit suitable for detecting a rotational movement of a drive wheel, wherein the at least one detection unit does not detect any electrical output alternating quantity of the at least one traction power converter and does not detect any quantity that is influenced by an electrical state and/or a magnetic state of the electric traction motor or of at least one of the electric traction motors, wherein the state is dependent on a movement and/or position of a rotor of the electric traction motor.

The signal provided by the detection unit is evaluated by the traction control unit.

In this alternative method step, the at least one traction power converter is preferably in an idle state so that no electric traction motor is supplied with electric power.

In a second operating mode, the method, as an alternative or in addition to the use of the aforementioned detection unit, can comprise: supplying the electric traction motor or at least one of the plurality of electric traction motors with electric power, without generating traction in the process.

For this purpose, the traction control unit accordingly controls the at least one traction power converter. In this embodiment, in the second operating mode, the method furthermore comprises detecting a rotational movement of at least one drive wheel of the vehicle, based on a change in the electrical output alternating quantities of the at least one traction power converter. For this purpose, the traction control unit evaluates the output alternating quantities of the at least one traction power converter in accordance with the rotary encoderless methods described at the outset, and continuously determines the position and/or the speed of the rotor.

It shall be emphasized that the method steps of the second operating mode are exclusively carried out during the state of standstill of the vehicle and are accordingly carried out by the traction control unit.

According to a preferred embodiment of the method, no more than two of the plurality of electric traction motors are supplied with electric power during the state of standstill of the vehicle, without generating traction in the process.

The traction control unit accordingly controls, by closed-loop/open-loop control, the at least one traction power converter.

If the vehicle is designed with more than two electric traction motors, the reduction in the number of the electric traction motors supplied with electric power during the standstill results in a reduction in the power consumption of the vehicle during the standstill.

According to another preferred embodiment of the method, no more than one of the plurality of electric traction motors is supplied with electric power during the state of standstill of the vehicle, without generating traction in the process.

The traction control unit accordingly controls, by closed-loop/open-loop control, the at least one traction power converter.

If the vehicle is designed with a plurality of electric traction motors, the further reduction in the number of the electric traction motors supplied with electric power during the standstill results in a further reduction in the power consumption of the vehicle during the standstill, compared to supplying no more than two of the plurality of electric traction motors.

According to another preferred embodiment of the method, the detection unit is a rotary encoder, an acceleration sensor, a resolver or a gravitational force sensor.

This has the advantage that the method, and in particular the detection of a rotational movement of a wheel, functions particularly reliably since the detection units of the aforementioned kind do not have a very complex design. The detection of a rotational movement is very robust and reliable, which is essential for safety, especially in this application. Furthermore a vehicle is provided, in particular a rail vehicle, comprising a drive system as described above, wherein the drive system is operated using the above-described method.

BRIEF DESCRIPTION OF THE DRAWINGS

Embodiments of the invention will be described hereafter based on the accompanying schematic figures. Features that agree with one another in terms of their nature and/or function may be denoted by identical reference numerals across the figures.

In the drawings.

DESCRIPTION OF THE INVENTION

Figure 1:
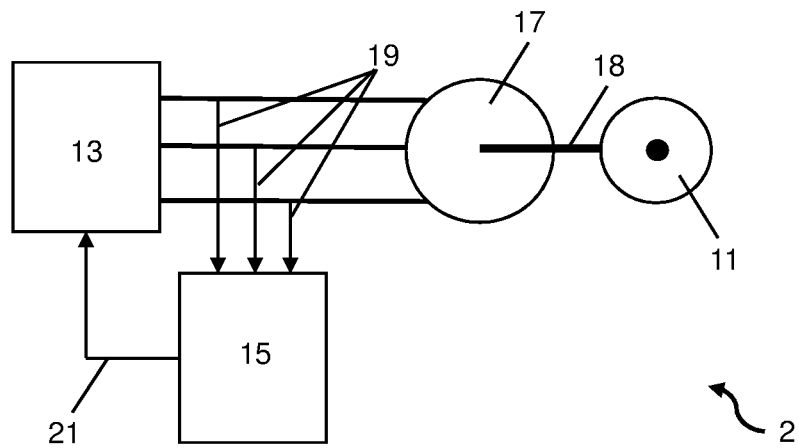
FIG. 1 shows a schematic representation of a drive system of a first embodiment according to the invention.

FIG. 1 shows a schematic representation of a drive system 2 of a first embodiment according to the invention, wherein a drive system 2 of this kind is installed in a vehicle, which is not shown. The drive system 2 comprises a traction power converter 13, a traction motor 17 which is electrically connected to the traction power converter 13, and a drive shaft 18 which connects the traction motor 17 to a drive wheel without rotary encoder 11 in a force-fit manner.

In addition, the drive system 2 comprises a traction control unit 15, which is connected to the traction power converter 13 in terms of signaling.

The traction control unit 15 controls the traction power converter 13 by way of corresponding activation signals 21.

The traction control unit 15 additionally comprises signal inputs for measuring the output-side alternating quantities 19 of the traction power converter 13, in particular current and voltage. Two operating scenarios that are essential for the vehicle must be distinguished.

In the first operating scenario, the traction power converter 13 is controlled by the traction control unit 15 in such a way that a three-phase alternating voltage having a suitable frequency, amplitude and phase is generated. The traction motor 17 generates torque based on this alternating voltage.

This torque is transmitted by way of the drive shaft 18 (and, if necessary, a gearbox situated between the traction motor 17 and the drive wheel without rotary encoder 11) to the drive wheel without rotary encoder 11.

Traction is generated, and the vehicle is accelerated, or also decelerated, based on the contact between the wheel and the ground.

This described operating scenario of the drive system 2 is employed while the vehicle is moving. In the second operating scenario, the traction power converter 13 is controlled by the traction control unit 15 in such a way that a three-phase alternating voltage having a suitable frequency, amplitude and phase is generated. However, this alternating voltage is controlled, by closed-loop/open-loop control, in such a way that the traction motor 17 does not generate torque, and the vehicle thereafter remains at a standstill.

Since the drive wheel without rotary encoder 11 is mechanically coupled to the traction motor 17, the position of the rotor (not shown) of the traction motor 17 changes during a rotational movement of the drive wheel without rotary encoder 11.

The change in position of the rotor is accompanied by a change in the electrical parameters, such as a change in reactance of the traction motor 17.

The change in reactance consequently results in a change in the output-side alternating quantities 19 of the traction power converter 13, and this can be detected by the traction control unit 15 based on the evaluation of the output-side alternating quantities 19, and a rotational movement can be inferred. The description of the exemplary embodiments based on the accompanying figures does not mention in detail the alternative or additional procedure in which at least one quantity that is dependent on the electrical and/or magnetic state of the traction motor(s) is measured, and the quantity is evaluated to ascertain a rotational movement. This alternative, or additional procedure, however, is possible in all exemplary embodiments.

The use of other methods known from the literature for this purpose is possible.

This described operating scenario of the drive system 2 is employed in the state of standstill of the vehicle.

The traction control unit 15 does not require a rotary encoder signal 23 for the closed-loop/open-loop control of the traction power converter 13 in either of the two aforementioned operating scenarios of the drive system 2.

The drive system 2 is consequently implemented entirely without rotary encoders.

The output-side alternating quantities 19 of the traction power converter 13 are exclusively controlled, by closed-loop/open-loop control, based on the output-side alternating quantities 19 detected by the traction control unit 15 and the specification of a speed and/or an acceleration of the vehicle of a higher-level vehicle control unit, which is not shown.

The open-loop and closed-loop control methods for rotary encoderless, speed-variable drives known from the literature are used for this purpose.

Figure 2:
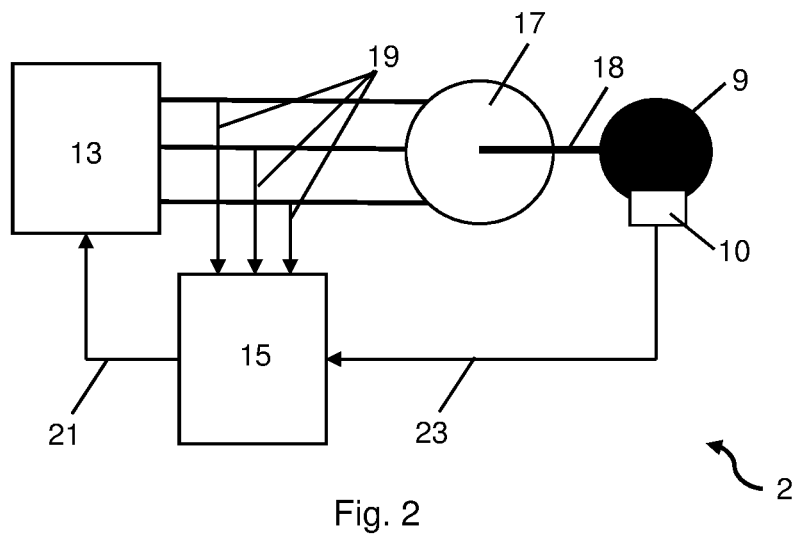
FIG. 2 shows a schematic representation of a drive system of a second embodiment according to the invention.

FIG. 2 shows a schematic representation of a drive system 2 of a second embodiment according to the invention, wherein a drive system 2 of this kind is installed in a vehicle, which is not shown.

The drive system 2 comprises a traction power converter 13, a traction motor 17 which is electrically connected to the traction power converter 13, and a drive shaft 18 which connects the traction motor 17 to a drive wheel with rotary encoder 9 in a force-fit manner.

The drive system 2 furthermore comprises a rotary encoder 10, which is arranged at the drive wheel with rotary encoder 9 and converters rotational movements of the drive wheel with rotary encoder 9 into rotary encoder signals 23.

As an alternative, the rotary encoder 10 can also be attached to the drive shaft 18 or to the output shaft (not shown) of the traction motor 17.

In addition, the drive system 2 comprises a traction control unit 15, which is connected to the traction power converter 13 in terms of signaling.

The traction control unit 15 controls the traction power converter 13 by way of corresponding activation signals 21.

The traction control unit 15 additionally comprises signal inputs for measuring the output-side alternating quantities 19 of the traction power converter 13, in particular current and voltage.

The traction control unit 15 additionally comprises at least one signal input to measure the rotary encoder signal 23 of the rotary encoder 10.

There are also two essential operating scenarios of the drive system 2 in this exemplary embodiment.

In the first operating scenario, the traction power converter 13 is controlled by the traction control unit 15 in such a way that a three-phase alternating voltage having a suitable frequency, amplitude and phase is generated. The traction motor 17 generates torque based on this alternating voltage.

This torque is transmitted by way of the drive shaft 18 (and, if necessary, a gearbox situated between the traction motor 17 and the drive wheel without rotary encoder 11) to the drive wheel with rotary encoder 9.

Traction is generated, and the vehicle is accelerated, or also decelerated, based on the contact between the wheel and the ground.

This described operating scenario of the drive system 2 is employed while the vehicle is moving.

In the second operating scenario, the traction power converter 13 is in an idle state, which means that no alternating voltage is generated at the power output of the traction power converter 13.

In contrast, the rotary encoder signal 23 is evaluated by the traction control unit 15 in this operating scenario.

As a result of the evaluation of the rotary encoder signal 23, the traction control unit 15 is thus able to detect a rotational movement of the drive wheel with rotary encoder 9.

This described operating scenario of the drive system 2 is employed during the state of standstill of the vehicle.

In the first operating scenario, the traction control unit 15, however, does not require a rotary encoder signal 23 for the closed-loop/open-loop control of the traction power converter 13.

The output-side alternating quantities 19 of the traction power converter 13 are exclusively controlled, by closed-loop/open-loop control, based on the detected output-side alternating quantities 19 and the specification of a speed and/or an acceleration of a higher-level vehicle control unit, which is not shown.

The open-loop and closed-loop control methods for rotary encoderless, speed-variable drives known from the literature are used for this purpose.

Figure 3:
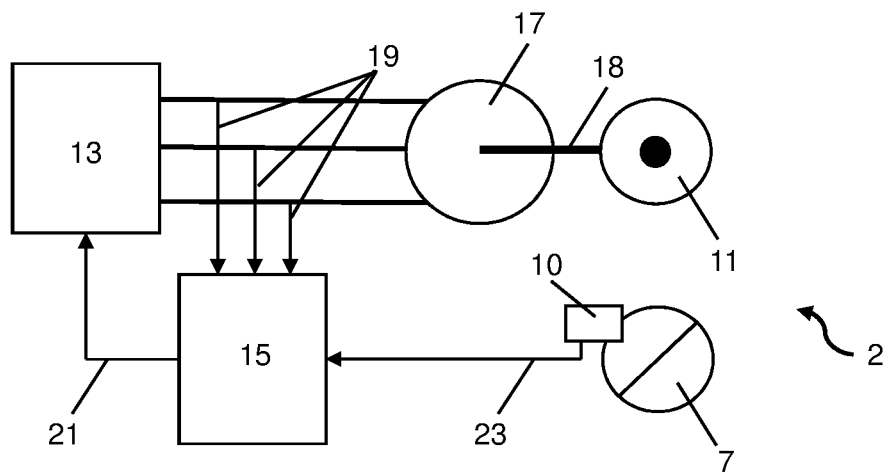
FIG. 3 shows a schematic representation of a drive system of a third embodiment according to the invention.

FIG. 3 shows a schematic representation of a drive system 2 of a third embodiment according to the invention, wherein a drive system 2 of this kind is installed in a vehicle, which is not shown. The drive system 2 comprises a traction power converter 13, a traction motor 17 which is electrically connected to the traction power converter 13, and a drive shaft 18 which connects the traction motor 17 to a drive wheel without rotary encoder 11 in a force-fit manner.

In addition, the drive system 2 comprises a traction control unit 15, which is connected to the traction power converter 13 in terms of signaling.

The traction control unit 15 controls the traction power converter 13 by way of corresponding activation signals 21.

The traction control unit 15 additionally comprises signal inputs for measuring the output-side alternating quantities 19 of the traction power converter 13, in particular current and voltage. The drive system 2 furthermore comprises a rotary encoder 10, which is arranged at a non-driven wheel 7 and converters rotational movements into rotary encoder signals 23.

The traction control unit 15 additionally comprises at least one signal input to measure the rotary encoder signal 23 of the rotary encoder 10.

There are also two essential operating scenarios of the drive system 2 in this exemplary embodiment.

In the first operating scenario, the traction power converter 13 is controlled by the traction control unit 15 in such a way that a three-phase alternating voltage having a suitable frequency, amplitude and phase is generated. The traction motor 17 generates torque based on this alternating voltage.

This torque is transmitted by way of the drive shaft 18 (and, if necessary, a gearbox situated between the traction motor 17 and the drive wheel without rotary encoder 11) to the drive wheel without rotary encoder 11.

Traction is generated, and the vehicle is accelerated, or also decelerated, based on the contact between the wheel and the ground.

This described operating scenario of the drive system 2 is employed while the vehicle is moving.

In the second operating scenario, the traction power converter 13 is in an idle state, which means that no alternating voltage is generated at the power output of the traction power converter 13.

In contrast, the rotary encoder signal 23 is evaluated by the traction control unit 15 in this operating scenario.

As a result of the evaluation of the rotary encoder signal 23, the traction control unit 15 is thus able to detect a rotational movement of the non-driven wheel with rotary encoder 7.

This described operating scenario of the drive system 2 is employed during the state of standstill of the vehicle.

In the first operating scenario, the traction control unit 15, however, does not require a rotary encoder signal 23 for the closed-loop/open-loop control of the traction power converter 13.

The output-side alternating quantities 19 of the traction power converter 13 are exclusively controlled, by closed-loop/open-loop control, based on the detected output-side alternating quantities 19 and the specification of a speed and/or an acceleration of a higher-level vehicle control unit, which is not shown.

The open-loop and closed-loop control methods for rotary encoderless, speed-variable drives known from the literature are used for this purpose.

As an alternative or in addition, the traction power converter 13 can be controlled by the traction control unit 15 in the second operating scenario in such a way that a three-phase alternating voltage having a suitable frequency, amplitude and phase is generated, wherein this three-phase alternating voltage supplies the traction motor 17 assigned to the drive wheel without rotary encoder 11.

This alternating voltage is controlled, by closed-loop/open-loop control, in such a way that this traction motor 17 does not generate torque, and the vehicle then remains at a standstill. Since the drive wheel without rotary encoder 11 is mechanically coupled to the traction motor 17, the position of the rotor (not shown) of this traction motor 17 changes during a rotational movement of the drive wheel without rotary encoder 11.

The change in position of the rotor is accompanied by a change in the electrical parameters, such as a change in reactance of the traction motor 17.

The change in reactance consequently results in a change in the output-side alternating quantities 19 of the traction power converter 13, and this can be detected by the traction control unit 15 based on the evaluation of the output-side alternating quantities 19, and a rotational movement can be inferred.

The use of other methods known from the literature for this purpose is possible.

This alternative or additional operating scenario of the drive system 2 is also employed in the state of standstill of the vehicle.

In this alternative or additional operating scenario, the traction control unit 15 does not require a rotary encoder signal 23 for the closed-loop/open-loop control of the traction power converter 13.

The output-side alternating quantities 19 of the traction power converter 13 are exclusively controlled, by closed-loop/open-loop control, based on the output-side alternating quantities 19 detected by the traction control unit 15.

The open-loop and closed-loop control methods for rotary encoderless, speed-variable drives known from the literature are used for this purpose.

Figure 4:
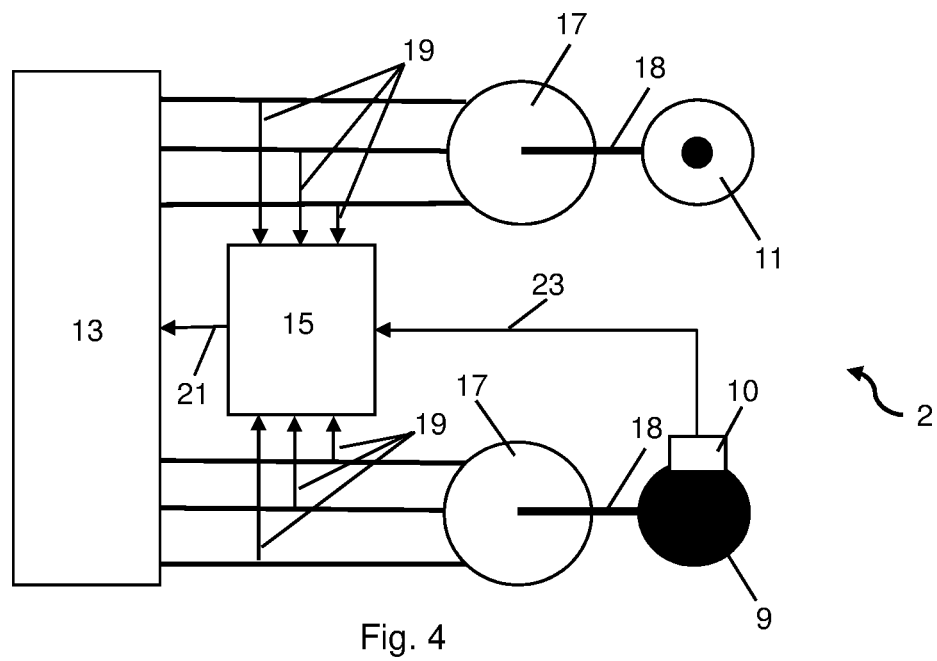
FIG. 4 shows a schematic representation of a drive system of a fourth embodiment according to the invention.

FIG. 4 shows a schematic representation of a drive system 2 of a fourth embodiment according to the invention, wherein a drive system 2 of this kind is installed in a vehicle, which is not shown.

The drive system 2 comprises a traction power converter 13, two traction motors 17 which are electrically connected to the traction power converter 13, and two drive shafts 18 which each connect the traction motors 17 to a drive wheel with rotary encoder 9 and to a drive wheel without rotary encoder 11 in a force-fit manner.

The drive system 2 furthermore comprises a rotary encoder 10, which is arranged at the drive wheel with rotary encoder 9 and converters rotational movements of the drive wheel with rotary encoder 9 into rotary encoder signals 23.

As an alternative, the rotary encoder 10 can also be attached to the drive shaft 18 or to the output shaft (not shown) of the traction motor 17, which is assigned to the drive wheel with rotary encoder 9.

In addition, the drive system 2 comprises a traction control unit 15, which is connected to the traction power converter 13 in terms of signaling.

The traction control unit 15 controls the traction power converter 13 by way of corresponding activation signals 21.

The traction control unit 15 additionally comprises signal inputs for measuring the output-side alternating quantities 19 of the traction power converter 13, in particular current and voltage.

The traction control unit 15 additionally comprises at least one signal input to measure the rotary encoder signal 23 of the rotary encoder 10.

The traction power converter 13 is shown and implemented as one unit in the process. However, the traction power converter 13 can be implemented as two independent traction power converters 13, each then being assigned to a traction motor 17. The traction control unit would have to be accordingly adapted.

There are also two essential operating scenarios of the drive system 2 in this exemplary embodiment.

In the first operating scenario, the traction power converter 13 is controlled by the traction control unit 15 in such a way that three-phase alternating voltages having a suitable frequency, amplitude and phase are generated so as to supply the two traction motors 17 with electric power. The two traction motors 17 generate torque based on this alternating voltage.

This torque generated in the process is transmitted by way of the drive shafts 18 (and, if necessary, a gearbox situated between the traction motor 17 and the drive wheel without rotary encoder 11) to the drive wheel with rotary encoder 9 and the drive wheel without rotary encoder 11.

Traction is generated, and the vehicle is accelerated, or also decelerated, based on the contact between the wheel and the ground.

This described operating scenario of the drive system 2 is employed while the vehicle is moving. In the second operating scenario, the traction power converter 13 is in an idle state, which means that no alternating voltages are generated at the power output of the traction power converter 13. The vehicle then remains at a standstill.

However, the rotary encoder signal 23 is evaluated by the traction control unit 15 in this operating scenario.

As a result of the evaluation of the rotary encoder signal 23, the traction control unit 15 is thus able to detect a rotational movement of the drive wheel with rotary encoder 9.

This described operating scenario of the drive system 2 is employed during the state of standstill of the vehicle.

In the first operating scenario, the traction control unit 15, however, does not require a rotary encoder signal 23 for the closed-loop/open-loop control of the traction power converters 13. The output-side alternating quantities 19 of the traction power converters 13 are exclusively controlled, by closed-loop/open-loop control, based on the detected output-side alternating quantities 19 and the specification of a speed and/or an acceleration of a higher-level vehicle control unit, which is not shown.

The open-loop and closed-loop control methods for rotary encoderless, speed-variable drives known from the literature are used for this purpose.

As an alternative or in addition, the traction power converter 13 can be controlled by the traction control unit 15 in the second operating scenario in such a way that at least a three-phase alternating voltage having a suitable frequency, amplitude and phase is generated, wherein this three-phase alternating voltage exclusively supplies the traction motor 17 assigned to the drive wheel without rotary encoder 11.

This alternating voltage is controlled, by closed-loop/open-loop control, in such a way that this traction motor 17 does not generate torque, and the vehicle then remains at a standstill. Since the drive wheel without rotary encoder 11 is mechanically coupled to the traction motor 17, the position of the rotor (not shown) of this traction motor 17 changes during a rotational movement of the drive wheel without rotary encoder 11.

The change in position of the rotor is accompanied by a change in the electrical parameters, such as a change in reactance of the traction motor 17, which is assigned to the drive wheel without rotary encoder 11.

The use of other methods known from the literature for this purpose is possible.

The change in reactance consequently results in a change in the output-side alternating quantities 19 of the traction power converter 13, and this can be detected by the traction control unit 15 based on the evaluation of the output-side alternating quantities 19, and a rotational movement can be inferred.

The use of other methods known from the literature for this purpose is possible.

This alternative or additional operating scenario of the drive system 2 is also employed in the state of standstill of the vehicle.

In this alternative or additional operating scenario, the traction control unit 15 does not require a rotary encoder signal 23 for the closed-loop/open-loop control of the traction power converter 13.

The output-side alternating quantities 19 of the traction power converter 13 are exclusively controlled, by closed-loop/open-loop control, based on the output-side alternating quantities 19 (of the traction motor 17 assigned to the drive wheel without rotary encoder 11) detected by the traction control unit 15.

The open-loop and closed-loop control methods for rotary encoderless, speed-variable drives known from the literature are used for this purpose.

A vehicle, in particular a group of rail vehicles 3 is described hereafter, comprising a drive system 2 from the preceding exemplary embodiments.

The invention is particularly advantageous for vehicles comprising a plurality of drives or driven wheels.

Here, the power consumption of the drive system can be substantially reduced during the standstill of the vehicle, without adversely affecting the safety of the vehicle.

Figure 5:
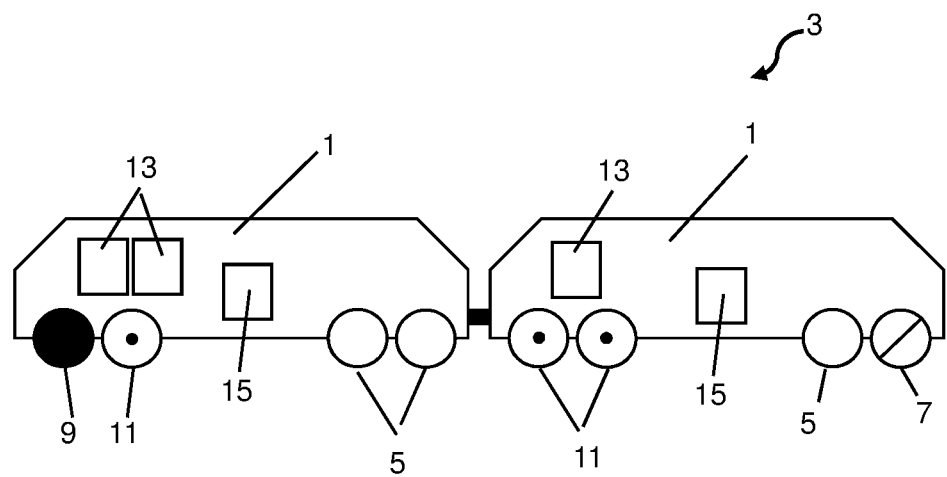
FIG. 5 shows a schematic representation of a group of rail vehicles comprising the drive system according to the invention.

FIG. 5 shows a schematic representation of a plurality of rail vehicles 1, wherein the individual vehicles are combined to form a group of rail vehicles 3.

Each of the two rail vehicles 1 comprises a drive system for generating traction.

In rail vehicles 1, it is customary to connect two individual wheels in a force-fit manner to one another by way of a shaft, so as to form a wheelset.

It is also known to design rail vehicles 1 with individual wheels, which may be driven or non-driven.

As a result, wheel or wheels is also used as a synonym for wheelset hereafter, wherein the wheel can be designed as a drive wheel or as a non-driven wheel.

The first rail vehicle 1 (from left to right) comprises a first drive system, wherein the drive system comprises a drive wheel with rotary encoder 9, a drive wheel without rotary encoder 11, two traction power converters 13, and a traction control unit 15.

The rail vehicle 1 furthermore comprises two non-driven wheels without rotary encoder 5. The drive wheel with rotary encoder 9, as well as the drive wheel without rotary encoder 11, are each mechanically connected to a traction motor, which is not shown.

The individual traction motors are each electrically connected to one of the two traction power converters 13, so that the two traction motors can be supplied with electric power independently of one another.

The traction power converters 13, and in particular the operation thereof, are controlled, by closed-loop/open-loop control, by the traction control unit 15.

The traction control unit 15 receives relevant information from a higher-level vehicle control unit, which is not shown, for the respective operating state of the rail vehicle 1.

This can, for example, be a specification of the speed and/or acceleration, wherein the control unit 15 converts the specification of the higher-level vehicle control unit into corresponding control signals for the traction power converters 13 so as to supply the traction motors with electric power.

In particular, the two traction motors are supplied with electric power while the rail vehicle 1 is moving so as to drive the rail vehicle 1.

In the process, the control unit 15 controls, by closed-loop and/or open-loop control, the rotational speed of the traction motors, among other things, wherein the open-loop/closed-loop control of the rotational speed is exclusively carried out based on the output-side alternating quantities of the two traction power converters 13.

This means that the rotary encoder of the drive wheel with rotary encoder 9 is not evaluated while the rail vehicle 1 is moving.

In contrast, the rotary encoder of the drive wheel with rotary encoder 9 is evaluated by the control unit 15 during the state of standstill of the rail vehicle 1 so as to detect a rotational movement of the drive wheel with rotary encoder 9, wherein a movement, and in particular a rolling, of the rail vehicle 1 can be inferred in the process.

The traction motors of the two drive wheels are preferably not supplied with electric power during the state of standstill of the rail vehicle, and a movement is exclusively detected by way of the rotary encoder of the drive wheel with rotary encoder 9.

In addition or as an alternative, the traction motor of the drive wheel with rotary encoder 9 can be supplied with electric power during the state of standstill, however without generating torque, and thus traction, in the process.

The control unit 15 controls, by open-loop/closed-loop control, the traction power converter 13 and evaluates the output-side alternating quantities of the traction power converter 13. Based on a change in the output-side alternating quantities of the traction power converter 13, it is possible to detect a rotational movement of the drive wheel with rotary encoder 9.

In addition or as an alternative, the traction motor of the drive wheel without rotary encoder 11 can be supplied with electric power in the state of standstill of the rail vehicle 1, so as to detect a rotational movement of the drive wheel without rotary encoder 11. In the process, the second traction power converter 13 supplies the traction motor of the drive wheel without rotary encoder 11 with electric power in the state of standstill of the rail vehicle 1, wherein the traction motor also does not generate torque in the process, and the vehicle thus remains at a standstill.

The control unit 15 controls, by open-loop/closed-loop control, the associated traction power converter 13 and evaluates the output-side alternating quantities of the traction power converter 13, so as to detect a rotational movement of the drive wheel without rotary encoder 11.

The control unit 15 is able to detect a rotational movement of at least one drive wheel of the rail vehicle 1 in each of the preceding examples. If a rotational movement is detected during the standstill state, the control unit 15 reports this movement to the higher-level vehicle control unit (not shown).

The higher-level vehicle control unit can take appropriate counter measures so as to prevent the rail vehicle 1 from rolling.

For example, the higher-level vehicle control unit can prompt the brake control units, which are not shown, to increase the braking force.

The second rail vehicle 1 (from left to right) comprises a further drive system, wherein the drive system comprises two drive wheels without rotary encoder 11, a traction power converter 13, and a traction control unit 15.

The second rail vehicle 1 furthermore comprises two non-driven wheels, wherein one is designed as a non-driven wheel without rotary encoder 5 and one is designed as a non-driven wheel with rotary encoder 7.

The two drive wheels without rotary encoder 11 are each mechanically connected to a traction motor, which is not shown.

The individual traction motors are each electrically connected to the traction power converter 13, so that the two traction motors can be supplied with electric power.

The traction power converter 13, and in particular the operation thereof, is controlled, by closed-loop/open-loop control, by the traction control unit 15.

The traction control unit 15 receives relevant information from a higher-level vehicle control unit, which is not shown, for the respective operating state of the rail vehicle 1.

The two traction motors are supplied with electric power while the rail vehicle 1 is moving so as to drive the rail vehicle 1.

In the process, the control unit 15 controls, by closed-loop and/or open-loop control, among other things the rotational speed of the traction motors, wherein the open-loop/closed-loop control of the rotational speed is exclusively carried out based on the output-side alternating quantities of the traction power converter 13.

This means that the rotary encoder of the non-driven wheel with rotary encoder 7 is not evaluated while the rail vehicle 1 is moving.

In contrast, the rotary encoder of the non-driven wheel with rotary encoder 7 is evaluated by the control unit 15 during the state of standstill of the rail vehicle 1 so as to detect a rotational movement of the non-driven wheel with rotary encoder 7, wherein a movement, and in particular a rolling, of the rail vehicle 1 can be inferred in the process.

The traction motors of the two drive wheels are preferably not supplied with electric power during the state of standstill of the rail vehicle, and a movement is exclusively detected by way of the rotary encoder of the non-driven wheel with rotary encoder 7.

In addition or as an alternative, the traction motors of the drive wheels without rotary encoder 11 can be supplied with electric power during the state of the standstill, however without generating torque, and thus traction, in the process.

The control unit 15 controls, by open-loop/closed-loop control, the traction power converter 13 and evaluates the output-side alternating quantities of the traction power converter 13. Based on a change in the alternating quantities of the output-side alternating quantities of the traction power converter 13, it is possible to detect a rotational movement of the drive wheels without rotary encoder 11.

The control unit 15 is able to detect a rotational movement of at least one drive wheel or of a non-driven wheel of the rail vehicle 1 in each of the preceding examples. If a rotational movement is detected during the standstill state, the control unit 15 reports this movement to the higher-level vehicle control unit.

The higher-level vehicle control unit can implement appropriate counter measures so as to prevent the rail vehicle 1 from rolling.

For example, the higher-level vehicle control unit can prompt the brake control units, which are not shown, to increase the braking force.

The higher-level vehicle control unit can be located in one of the rail vehicles 1.

It is also possible for each of the two rail vehicles 1 to comprise a dedicated higher-level vehicle control unit.

As can be derived from FIG. 5, each of the two rail vehicles 1 is configured with a rotary encoder.

A rotary encoder in each rail vehicle is sufficient to reliably detect the standstill.

Since a group of rail vehicles 3 is involved, it would even be sufficient to evaluate only one rotary encoder in the entire group of rail vehicles since the two rail vehicles 1 are connected in a force-fit manner to one another.

However, this would adversely affect the reliability of the standstill identification since redundancy is dispensed with.

If the rail vehicles 1 of the group of rail vehicles 3 are designed to be entirely rotary encoderless, for energy efficiency reasons no more than two traction motors of the total of four traction motors are supplied with electric power during the standstill state to reliably detect the standstill of the vehicle.

Preferably, however, no more than one traction motor (of the entire group of rail vehicles 3) is supplied with electric power. This minimizes the power consumption of the group of rail vehicles 3.

However, this would adversely affect the reliability of the standstill identification since redundancy is dispensed with.

It is also possible for a rail vehicle 1 to comprise more than two drive wheels, and thus more than two traction motors.

In this case as well, a maximum of two traction motors are supplied with electric power during the standstill state to reliably detect the standstill of the rail vehicle 1.

Preferably, however, only one traction motor is supplied with electric power to detect the standstill of the rail vehicle 1.

The invention claimed is:

1. A drive system for a vehicle, the drive system comprising:
    a plurality of electric traction motors, each of the electric traction motors being mechanically coupled to at least one drive wheel to generate traction;
    at least one traction power converter, the at least one traction power converter being connected on an AC voltage side to at least one of the plurality of electric traction motors to supply the at least one electric traction motor with electric power;
    a traction control unit for a closed-loop and/or an open-loop control of the at least one traction power converter, wherein the traction control unit being designed to control, by the closed-loop and/or the open-loop control, the at least one traction power converter while the vehicle is moving, based on electrical output alternating quantities of the at least one traction power converter,
    wherein the traction control unit being designed to detect a rotational movement of at least one drive wheel of the vehicle while the vehicle is driving, in the process of detecting a rotational movement:
        based on a change in the electrical output alternating quantities of the at least one traction power converter, and/or
        based on at least one quantity that is influenced by an electrical state and/or a magnetic state of the at least one electric traction motor or at least one of the plurality of electric traction motors, wherein the state being dependent on a movement and/or position of a rotor of the at least one electric traction motor, and
    wherein the traction control unit being designed, during a state of standstill of the vehicle,
    to detect a rotational movement of at least one wheel of the vehicle based on an evaluation of signals of at least one detection unit, without the at least one detection unit detecting any electrical output alternating quantities of the at least one traction power converter or any quantity that is influenced by an electrical state and/or a magnetic state of the at least one electric traction motor or at least one of the electric traction motors, the state being dependent on a movement and/or position of a rotor of the electric traction motor, and/or
    to detect a rotational movement of at least one drive wheel of the vehicle based on a change in the electrical output alternating quantities of the at least one traction power converter.

2. The drive system according to claim 1, wherein the traction control unit is furthermore designed to control the at least one traction power converter, during the standstill of the vehicle, in such a way that at least one, but no more than two of the plurality of electric traction motors are supplied with electric power.

3. The drive system according to claim 1, wherein the traction control unit is furthermore designed to control the at least one traction power converter, during the standstill of the vehicle, in such a way that no more than one of the plurality of electric traction motors is supplied with electric power.

4. The drive system according to claim 1, wherein the traction control unit is designed not to use signals of the detection unit for the closed-loop and/or open-loop control of at least one traction power converter while the vehicle is driving.

5. The drive system according to claim 1, wherein the detection unit is a rotary encoder, an acceleration sensor, a resolver, or a gravitational force sensor.

6. A vehicle comprising the drive system according to claim 1, wherein the drive system is operated using the method according to claim 1.

7. A method for operating the drive system according to claim 1, the method in a first operating mode comprising:
    supplying the at least one electric traction motor, or the plurality of electric traction motors, with electric power to generate traction, the rotational speed, the velocity, the torque and/or the position of the rotor of the electric traction motor, or of at least one of the electric traction motors, being controlled, while the vehicle is moving, based on
    electrical output alternating quantities of the at least one traction power converter, by closed-loop and/or open-loop control, and/or
    at least one quantity that is influenced by an electrical state and/or a magnetic state of the electric traction motor or at least one of the electric traction motors, the state being dependent on a movement and/or position of a rotor of the electric traction motor(s),
    the method in an at least second operating mode, during a standstill state of the vehicle, comprising:
        detecting a rotational movement of at least one wheel of the vehicle, by evaluating signals of at least one detection unit suitable for detecting a rotational movement of a wheel, the at least one detection unit not detecting any electrical output alternating quantity of the at least one traction power converter and not detecting any quantity that is influenced by an electrical state and/or a magnetic state of the electric traction motor or of at least one of the electric traction motors, the state being dependent on a movement and/or position of a rotor of the electric traction motor, and/or
        detecting a rotational movement of at least one drive wheel of the vehicle based on a change in the electrical output alternating quantities of the at least one traction power converter.

8. The method according to claim 7, wherein no more than two of the plurality of electric traction motors are supplied with electric power, without generating traction in the process.

9. The method according to claim 7, wherein no more than one of the plurality of electric traction motors is supplied with electric power, without generating traction in the process.

10. The method according to claim 7, wherein signals of the detection unit are not used for the closed-loop and/or open-loop control of at least one traction power converter while the vehicle is driving.

11. The method according to claim 7, wherein the detection unit is a rotary encoder, an acceleration sensor, a resolver, or a gravitational force sensor.

* * * * *